US010484261B2

(12) United States Patent
Yun et al.

(10) Patent No.: US 10,484,261 B2
(45) Date of Patent: Nov. 19, 2019

(54) METHOD AND SYSTEM FOR PERFORMANCE MEASUREMENT OF A COMMUNICATION LINK

(75) Inventors: Sungho Yun, Cupertino, CA (US); Carlos Garcia Hernandez, Campbell, CA (US); Manikanden Balakrishnan, Foster City, CA (US); Wonjong Rhee, San Francisco, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 14/414,437

(22) PCT Filed: Jul. 13, 2012

(86) PCT No.: PCT/US2012/046811

§ 371 (c)(1),
(2), (4) Date: Jan. 12, 2015

(87) PCT Pub. No.: WO2014/011192

PCT Pub. Date: Jan. 16, 2014

(65) Prior Publication Data

US 2015/0200834 A1 Jul. 16, 2015

(51) Int. Cl.
*H04L 12/26* (2006.01)
*H04L 12/24* (2006.01)

(52) U.S. Cl.
CPC .............. *H04L 43/10* (2013.01); *H04L 41/08* (2013.01); *H04L 43/08* (2013.01);
(Continued)

(58) Field of Classification Search
None
See application file for complete search history.

(56) References Cited

U.S. PATENT DOCUMENTS 2,005,011 A 6/1935 Specht
2,005,111 A 6/1935 Shore
(Continued)

FOREIGN PATENT DOCUMENTS

JP 2005519503 6/2005
JP 2007116329 5/2007
(Continued)

OTHER PUBLICATIONS

International Search Report and Written Opinion for International Patent Application No. PCT/US2012/046811, dated Feb. 13, 2013.
(Continued)

*Primary Examiner* — Michael J Moore, Jr.
(74) *Attorney, Agent, or Firm* — North Weber & Baugh LLP

(57) ABSTRACT

Described is a method for performance measurement of a communication device. The method comprises: executing active probing by a communication device coupled to another communication device via a network forming a communication link; reading operational data associated with the communication link in response to executing active probing; and measuring performance, by the communication device, of the communication link with reference to the communication link, the performance measured according to the read operational data.

37 Claims, 5 Drawing Sheets

(52) U.S. Cl.
CPC ...... *H04L 43/0817* (2013.01); *H04L 43/0823* (2013.01); *H04L 43/50* (2013.01)

(56) References Cited

U.S. PATENT DOCUMENTS

| | | | | |
|---|---|---|---|---|
| 5,867,483 A * | 2/1999 | Ennis, Jr. | H04L 41/0896 | 370/252 |
| 6,201,791 B1 | 3/2001 | Bournas | | |
| 7,009,957 B2 | 3/2006 | Wu et al. | | |
| 7,496,046 B2 * | 2/2009 | Kanazawa | H04L 1/20 | 370/232 |
| 7,558,202 B2 * | 7/2009 | Luo | H04L 47/10 | 370/232 |
| 7,619,982 B2 * | 11/2009 | Blair | H04L 45/54 | 370/248 |
| 7,729,268 B2 * | 6/2010 | Matta | H04L 12/2602 | 370/252 |
| 7,769,884 B2 * | 8/2010 | Acharya | H04L 12/2856 | 709/223 |
| 7,848,230 B2 * | 12/2010 | Shah | H04L 45/00 | 370/229 |
| 8,547,855 B1 * | 10/2013 | Zingale | H04L 41/142 | 370/241 |
| 8,880,724 B2 * | 11/2014 | Shah | H04L 41/0668 | 370/229 |
| 2005/0111487 A1 | 5/2005 | Matta et al. | | |
| 2009/0116497 A1 * | 5/2009 | Varma | H04L 12/413 | 370/401 |
| 2009/0271508 A1 * | 10/2009 | Sommers | H04L 43/0829 | 709/224 |
| 2010/0157840 A1 * | 6/2010 | Sen | H04L 43/0835 | 370/253 |
| 2011/0044173 A1 | 2/2011 | Kakadia et al. | | |
| 2013/0301441 A1 * | 11/2013 | Russell | H04W 24/06 | 370/252 |

FOREIGN PATENT DOCUMENTS

| | | | |
|---|---|---|---|
| JP | 2008252551 | | 10/2008 |
| WO | 03075021 | A1 | 9/2003 |
| WO | 2004066077 | A2 | 8/2004 |
| WO | WO-2004/066077 | | 8/2004 |
| WO | 2006032890 | A2 | 3/2006 |
| WO | WO-2006/032890 | | 3/2006 |

OTHER PUBLICATIONS

EP Communication for EP Patent Application No. 12743284.7-1862, dated Mar. 18, 2015.

JP Office Action for JP Patent Application No. 2015-521589, dated Jan. 5, 2016, No translation available, KR Office Action for KR Patent Application No. 10-2015-7003634, dated Oct. 29, 2015.

Notice of Final Rejection, dated Sep. 30, 2016, for Korean Patent Application No. 1020157003634.

Office Action dated Nov. 20, 2015, in Canadian Patent Application No. 2,879,073 (5 pgs).

Office Action dated Jun. 13, 2016, in Korean Patent Application No. 10-2015-70036364 (6 pgs).

Office Action dated Jan. 3, 2017, in European Patent Application No. 12743284.7 (1 pg).

Response filed Mar. 13, 2017, in European Patent Application No. 12743284.7 (3 pgs).

Office Action dated Jun. 14, 2017, in European Patent Application No. 12743284.7 (5 pgs).

Office Action dated Apr. 5, 2017, in Chinese Patent Application No. 201280075723.7 (14 pgs).

Office Action dated Jun. 14, 2017, in European Patent Application No. 12743284.7 (4pgs).

Notice of Allowance dated Sep. 4, 2017, in Korean Patent Application No. 10-2017-7000083 (3pgs).

Response filed Dec. 20, 2017, in European Patent Application No. 12743284.7 (3pgs).

Office Action dated Oct. 25, 2017, in Canadian Patent Application No. 2,879,073 (4pgs).

Office Action dated Dec. 14, 2017, in Chinese Patent Application No. 201280075723.7 (19pgs).

Office Action dated Oct. 5, 2018 in Canadian Patent Application No. 2,879,073 (5pgs).

Office Action dated Apr. 24, 2018 in Australian Patent Application No. 2016222369 (3pgs).

Office Action dated Jul. 2, 2018 in Chinese Patent Application No. 201280075723.7 (6pgs).

Office Action dated Aug. 28, 2017, in Australian Patent Application No. 2016222369 (12pgs).

Notice of Allowance dated Oct. 15, 2018, and claims, in Korean Patent Application No. 1020157003634 (13pgs).

Notice of Patent Grant dated Nov. 29, 2018, in Australia Patent No. 2016222369, dated Nov. 29, 2018 (1 pg).

Office Action dated Dec. 12, 2018, in Korean Patent Application No. 1020187033817 (11 pgs).

Office Action dated May 15, 2019, in Korean Patent Application No. 1020187033817 (5pgs).

Notice Granting a Patent Right dated May 21, 2019, in Chinese Patent Application No. 201280075723.7 (4pgs).

4th Office Action dated Feb. 15, 2019, in Chinese Patent Application No. 201280075723.7 (7pgs).

Extended European Search Report dated Mar. 20, 2019, in European Patent Application No. 18210562.7 (9pgs).

* cited by examiner

400

METHOD AND SYSTEM FOR PERFORMANCE MEASUREMENT OF A COMMUNICATION LINK

CROSS-REFERENCE TO RELATED APPLICATION

This application is the U.S. National Phase of International Application No. PCT/US2012/046811, filed Jul. 13, 2012, the disclosure of which is incorporated herein by reference in its entirety for all purposes.

BACKGROUND

Monitoring performance of a communication link is used, for instance, for proactively addressing and preventing user complaints, for deciding when to upgrade hardware associated with the communication link, for deciding when to trigger an optimization algorithm to optimize the communication link, for verifying that the optimization algorithm has indeed resulted in improved performance, etc.

The term "performance" herein refers generally to network throughput (e.g., TCP/UDP), latency, jitter, connectivity, error rates, power consumption, transmit power, etc. Improving performance of the communication system includes increasing throughput, reducing error rate and latency, improving jitter, power consumption, etc. for the communicating system. Monitoring performance generally refers to determining and/or calculating one or more of the above performance parameters associated with the communication link. The term "TCP" stands for transmission control protocol. The term "UDP" refers to user datagram protocol.

Communication system performance can be evaluated using traditional testing software applications such as iperf, netperf, ttcp, etc. Such software applications need to be installed on at least two communication devices where the software application on one communication device generates and transmits test data to the other communication device, and where the software application on the other communication device receives the test data.

After transmitting and receiving the test data, statistics of the test data transportation is evaluated to assess the performance of the communication link between the two communication devices. Testing of a communication system or network to gauge its performance via such traditional testing software applications requires compatible software applications to be installed or to be available at both communication devices that form the communication link.

For example, a user with a laptop visits a performance testing web site, and subsequently a testing software application is loaded to the user's web browser. Then the performance between the laptop and a server in the internet is measured using the testing software application that was already available at the server.

In some cases, however, it can be difficult, if not impossible, to have testing software applications available at both communication devices that are at the ends of the communication link of interest. For instance, when a network manager is interested in initiating a performance measurement from a Wi-Fi Access Point (AP) to a smart-phone, the network manager does not have any means to install a software application to the smart-phone. Therefore, the network manager cannot initiate performance measurement between the Wi-Fi AP and the smart-phone. In general, it is difficult to have applications available at communication devices coupled to a network or to initiate user-side installation of software applications as a network manager.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
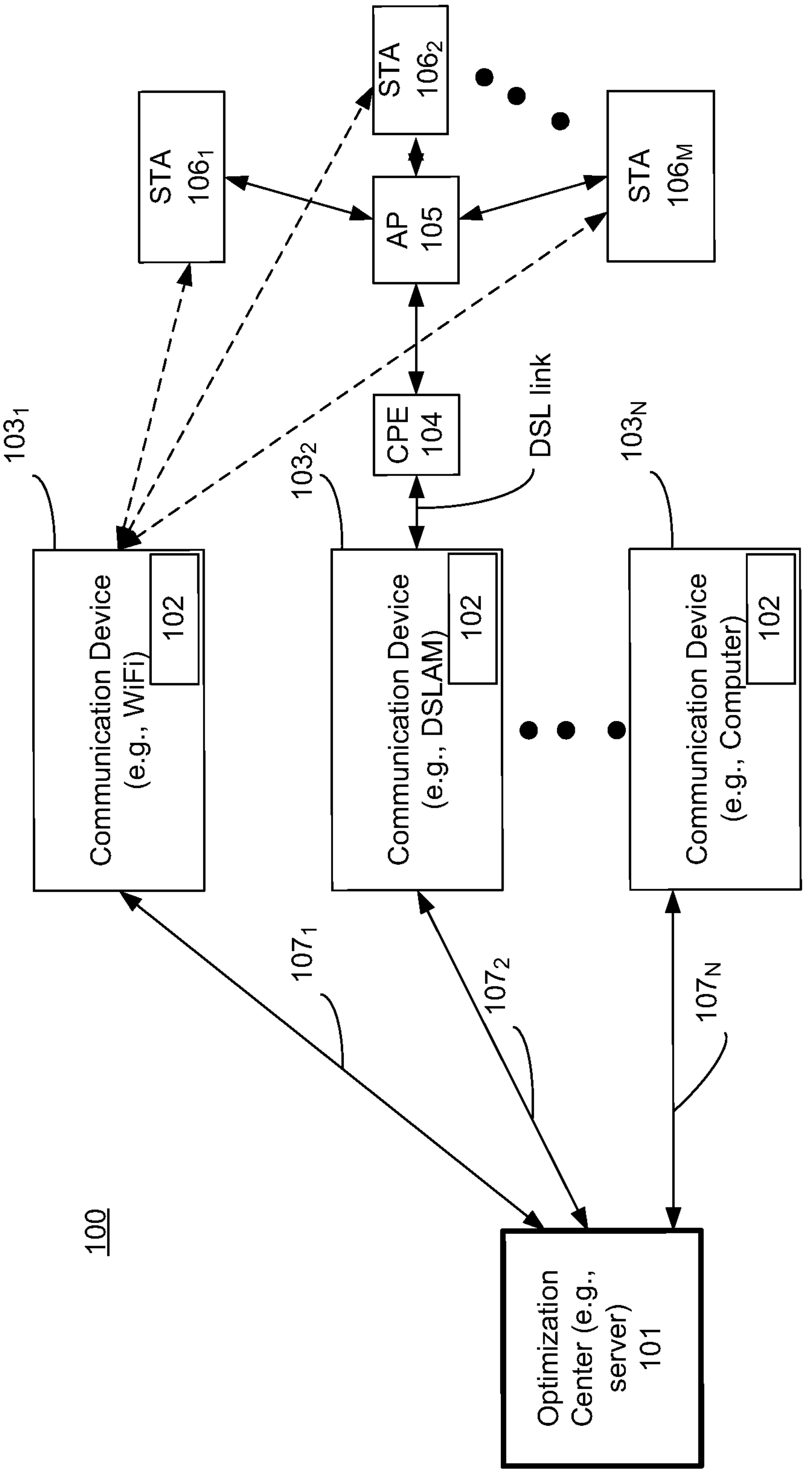
FIG. 1 is a communication network which is operable to measure performance of a communication link, according to one embodiment of the disclosure.

To overcome limitations discussed above and other limitations, method and system for measuring performance of a communication link without requiring availability of testing software applications on both sides of a communication link is described herein. In the embodiments discussed herein, the communication device transmitting test data has the testing software application while the other communication device does not have the testing software application.

The traditional method to test network performance, which is intrusive to user network service, is referred to "active probing." The term "active probing" herein generally refers to testing of a communication network by sending test pattern/data (e.g., Ethernet packets) over the network from one communication device to another communication device, and then measuring the performance statistics of the sent test pattern/data at the receiver. Generally the receiving end does not send any response data. The receiving end may share the reception statistics with the transmitter i.e., the receiver shares a report with the transmitter.

Traditional active probing software such as iperf, netperf, ttcp, etc, is run at application layers, where data transmission application software and data reception application software are used together for accurately measuring performance between the two transmission and reception devices i.e., measuring performance of a communication link. Traditional active probing is accurate because actual test data is transmitted in the same way as user traffic would be transmitted over the network. Frequent active probing can be annoying to the user because it may cause delay in user traffic. It is possible to execute active probing without stopping user traffic, but such a measurement is not accurate because the testing traffic needs to compete with the user traffic, and furthermore active probing can significantly impair the user experience due to lower throughput and/or higher latency. As an example, throughput measurement is generally undervalued with a competition, because measurement from active probing accounts for the successfully received tests data and fails to account for the link's capacity that is used for user traffic.

An advanced active probing method is described in PCT Application No. PCT/US12/46810, entitled, "Method and System for Performance Estimation of a Communication Link" (filed concurrently with this application on Jul. 13, 2012, incorporated by reference herein in its entirety, and co-owned by ASSIA Inc. of Redwood City, Calif., 94065, USA), can avoid the user traffic issue, by considering operational data that account for the user traffic as well as the test traffic.

Furthermore, traditional active probing requires testing application to be available at both communication devices, at the ends of the communication link, such that one communication device can transmit testing data (i.e., active data) and the other communication device can receive the testing data using the same protocol for testing.

Another mechanism to gauge performance of a communication link and/or communication device is to monitor operational data associated with a communication device. The operational data is generated sometimes as a by-product of normal operation of the device and sometimes to provide basic performance or operation information. In contrast to active probing, reading or collecting of such data is not intrusive to user network service. Monitoring or reading of such communication data (operational data) is sometimes referred as "passive probing," herein.

Throughput associated with the communication link may be roughly estimated from typical operational data such as packet error counts and PHY-layer constellation information that indicate how many bits are being transmitted per data symbol.

The term "PHY" is an abbreviation for the physical layer of the Open Systems Interconnection (OSI) model. An instantiation of PHY connects a link layer device (often called a MAC) to a physical medium such as an optical fiber, copper wires or air (wireless communications).

The term "MAC address" is an abbreviation for Media Access Control address. MAC address is a unique identifier assigned to network interfaces for communications on the physical network segment. MAC addresses are used for numerous network technologies and most Institute of Electrical and Electronics Engineers (IEEE) 802 network technologies, including Ethernet. Logically, MAC addresses are used in the Media Access Control protocol sub-layer of the OSI reference model.

In the embodiments discussed herein, operational data are used together with active probing data to determine a reliable performance measurement. In one embodiment, the operational data are read from counters (also referred herein as operational counters) that increase in count value for successfully delivered packets.

The term 'successful" herein refers to an indication suggesting safe receipt of a packet that is often confirmed by ACK (acknowledge) message packet. In another embodiment, operational data such as error counts, retransmission counts, modulation, signal strength, etc. are used to estimate the throughput.

During the process of passive probing i.e., reading of operational data, customer network service is not interrupted. Operational data is generally user visible or accessible data and is generally used for debugging and basic performance monitoring of communications systems, but generally not for advanced performance estimation because the data was not designed for the performance monitoring, does not carry sufficient information related to performance and there is no known estimation algorithms with a high accuracy. Therefore, passive probing alone may not be enough to determine advanced performance of a communication system and operational data generally includes counter values that are only weakly associated with the current performance of a communication system.

The embodiments herein disclose a method and system for performance measurement of a communication link without having testing application software to be installed and used on both communication devices on both ends of the communication link. When one end of the two ends has such application software, the embodiments herein can be used to obtain accurate performance measurement. In one embodiment, active probing is performed by sending special packets by a communication device over the communication link to another communication device such that testing software application is installed on the transmitting communication device but not on the receiving communication device. In one embodiment, active probing and passive probing are performed to measure performance of the communication link.

In one embodiment, the packets may not be intended for any application at the receiver communication device, but ensures a full capacity use of PHY (layer 1) regardless of the amount of user traffic during performance measurement. Such packets may be eventually dropped by the receiver communication device at a certain communication layer (for example, layer 3 or above depending on packet construction), but some of the lower layers (for example, layers 1 and 2) can process the packet and hence result in behaviors that are observable and countable from the transmitting communication device. In one embodiment, active probing at any layer uses full capacity data at the PHY layer, because PHY is the lowest layer that all the other layers need to go through.

In one embodiment, passive operational counters at the transmitting communication device are used for counting successful transmissions of packets from the transmitting communication device to the receiving communication device. In one embodiment, between a Wi-Fi AP (Access Point, one of the communication devices) and a station (the other communication device), AP generates Ethernet packets directed to the station's MAC address with no real application-layer program at the station expecting and awaiting the packets.

In one embodiment, the Ethernet packets are transmitted from AP through Wi-Fi PHY/MAC layers (layers 1 and 2), received by station's Wi-Fi PHY/MAC layers, and eventually dropped by the station's layer 3 and above because there is no proper counterpart protocol or application to receive the data. Even though the Ethernet packets get dropped, the IEEE 802.11 PHY/MAC layer of station will send an 'ACK' signal for each successfully received Wi-Fi packet because of the inherent design of Wi-Fi PHY/MAC layer. Such ACK signals are counted in the Wi-Fi driver, and the count is available as operational data at the AP i.e., the transmitter. The count is part of many operational data that are available at the AP, and this count can be used to accurately calculate the total number of user data bytes that were successfully received by the station.

For example, a number of layer-2 ACK messages are counted. In another example, counters are read after a fixed duration of time. Because AP generates enough Ethernet packets to make sure that PHY layer is running at the highest (or near highest) speed possible, the calculated bytes divided over the time duration represents an accurate throughput of the Wi-Fi link. In one embodiment, the counters and bytes not only account for the test data generated by active probing, but also account for the traffic generated by the user. The test data might or might not slow down the user traffic. In either case, active probing makes sure that the data link is used at its maximum (or near maximum) capacity by transmitting sufficient amount of data. Therefore, the embodiments herein provide accurate measurements without requiring user traffic to be stopped or delayed.

In one embodiment, there is no need for any application-layer software to be available at the station, and therefore the station can be used in any situation with access to one of the two network communication devices. The embodiment discussed herein can also be applied from station side to send Ethernet packets to AP and measure the throughput from station to AP. In such an embodiment, there is no need for any application-layer software to be available at the AP. The embodiments of this disclosure are not limited to Ethernet packets or Wi-Fi. The embodiments of this disclosure can be used whenever relevant operational data is made available at the transmitter side. Such operational data include Ethernet packet count in Wi-Fi, ATM cell count in ATM over Digital Subscriber Line (DSL), etc.

In one embodiment, flooding the PHY layer with test data can be implemented with any type of data packets so long as the packets are not intended for network users. In one embodiment, Ping applications or any other well known applications to flood the PHY can be used. In one embodiment, if such a traffic generation (e.g., by Ping) is not feasible, operational data can still be observed for long enough time such that there are time periods where user generated traffic is large enough to use the full capacity of the PHY layer.

The term "Ping" herein refers to a computer network administration utility used to test the reach-ability of a host on an Internet Protocol (IP) network and to measure the round-trip time for messages sent from the originating host to a destination computer. Ping operates by sending Internet Control Message Protocol (ICMP) echo request packets to the target host and waiting for an ICMP response. In the process it measures the time from transmission to reception (round-trip time) and records any packet loss.

The embodiments herein can be used between two communication devices (also referred to as network elements) that are directly connected to each other where Layer 1 or Layer 2 counts, i.e. operational data, are available. In one embodiment, flooding of test data can be achieved with any Wi-Fi frame (layer-3 IP layer can be anything including UDP, TCP, ICMP, completely missing, etc.) or other layer-2 including ATM or Ethernet packets. Furthermore, any application layer programs that are commonly available, such as Ping, can be used, too.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The term "substantially," "approximately," "nearly," "about," "close," and such similar terms refer to a quantity being within +/−20% of a target value.

FIG. 1 is a communication network 100 which is operable to measure and improve communication link performance, according to one embodiment of the disclosure. In one embodiment, the communication network comprises an optimization center 101 (e.g., server) communicatively coupled to one or more communication devices $\mathbf{103}_{1\text{-}N}$, where 'N' is a positive integer. In one embodiment, communication device $\mathbf{103}_2$ is coupled to a Customer Premises Equipment (CPE) modem 104 via a DSL link. In one embodiment, the CPE modem 104 is coupled to an access point (AP) 105. In one embodiment, the AP 105 is coupled to one or more stations (STAs) $\mathbf{106}_{1\text{-}M}$, where 'M' is a positive integer.

In one embodiment, performance measurement software/algorithm 102 is provided (or installed) on a communication device (e.g., Wi-Fi device $\mathbf{103}_1$) which is used as a transmitter to send active probing data to one or more other communication devices $\mathbf{106}_{1\text{-}N}$.

While the embodiment of FIG. 1 does not show that the other devices 104, 105, and $\mathbf{106}_{1\text{-}M}$ include instructions for performance measurement 102, in one embodiment any communication device coupled directly or indirectly to the network (wired or wireless) may have instructions for measuring performance of a communication link when the other communication device on the link does not have the performance measuring software. In one embodiment, the performance measurement, from the performance measurement software 102, can be used to tune or configure the communication device to optimize the use of the communication link.

In one embodiment, the communication devices $\mathbf{103}_{1\text{-}N}$ include an access point (AP); a base station; a wireless local area network (LAN) device; a Digital subscriber line access multiplexer (DSLAM); a gateway; a performance enhancement device; a Digital Subscriber Line (DSL) CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; an set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the one or more communication devices $\mathbf{103}_{1\text{-}N}$ are operable to execute active probing to generate active probing data. In this embodiment, the one or more communication devices $\mathbf{103}_{1\text{-}N}$ flood traffic on their respective communication links to the stations $\mathbf{106}_{1\text{-}M}$, 104, or any other communication device. In this embodiment, response received by the one or more communication devices $\mathbf{103}_{1\text{-}N}$ from the stations $\mathbf{106}_{1\text{-}M}$, 104, or any other communication device over the communication links is the active data, which is used by the respective performance measurement softwares 102 in the corresponding one or more communication devices $\mathbf{103}_{1\text{-}N}$ to measure performance of their communication link, which can be then used to diagnose, train, tune, or configure the communication device to enhance performance of the respective communication link.

In one embodiment, the one or more communication devices $\mathbf{103}_{1\text{-}N}$ are operable to execute active probing by transmitting active probing data from one communication device to another communication device. For example, communication device $\mathbf{103}_1$ transmits active probing data to communication device $\mathbf{106}_1$ and/or communication device $\mathbf{103}_2$ transmits active probing data to CPE 104 over a DSL link. In this example, the testing software is not available on the receiving communication device i.e., communication device $\mathbf{106}_1$ or CPE 104. In another example, communication device $\mathbf{106}_1$ transmits active probing data to optimization center 101 via communication links including $\mathbf{107}_1$. In this example, the testing software is available on the communication device $\mathbf{106}_1$ and is not available on the receiving communication device i.e., optimization center 101.

In one embodiment, in response to transmitting test data (i.e., initiating active probing) the one or more communication devices $\mathbf{103}_{1\text{-}N}$ are further operable to wait for a predetermined time before reading the operational data including counter values related to user data traffic on the respective communication links. In one embodiment, the predetermined time is in the range of 0.001 seconds to 600 seconds. In other embodiments other waiting periods may be used. In one embodiment, the waiting period is programmable by software or hardware.

So as not to obscure the embodiments of the disclosure, communication devices $\mathbf{103}_1$, $\mathbf{103}_2$, 104, and optimization center 101 are discussed. The same discussion is applicable to other communication devices. In one embodiment, the communication device $\mathbf{103}_1$ is further operable to receive an operational data report indicating amount of data or data received by the other communication device (e.g., optimization center 101, and/or communication device $\mathbf{103}_2$). In one embodiment, the report is a number of ACK message received in response to sending active probing data. In another embodiment, the report indicates a size of the successful data received by the receiving communication device in response to a communication device sending active probing data.

In one embodiment, the one or more communication devices $\mathbf{103}_{1\text{-}N}$ are operable to read operational data which includes data related to channel (e.g., links $\mathbf{107}_{1\text{-}N}$, links between 105 and $\mathbf{106}_{1\text{-}M}$, links between $\mathbf{103}_1$ and $\mathbf{106}_{1\text{-}M}$, and/or DSL links between $\mathbf{103}_2$ and 104) and its noise condition, data relevant to the current setting of the communication devices $\mathbf{103}_{1\text{-}N}$, and counter values related to user data traffic between the communication devices $\mathbf{103}_{1\text{-}N}$ and another communication device (e.g., optimization center 101, 105, $\mathbf{106}_{1\text{-}M}$, 104, etc), wherein the operational data is relevant to the current settings of the communication device. Examples of such operational data are successful transmit packet counts, successful receive packet counts, ACK packet counts, errored packet counts, discarded packet counts, retransmission counts, etc.

In one embodiment, the one or more communication devices $\mathbf{103}_{1\text{-}N}$ are operable to train their respective performance estimation algorithms according to the active probing data transmitted and the operational data. In one embodiment, the one or more communication devices $\mathbf{103}_{1\text{-}N}$ are operable to, prior to executing active probing, read operational data (i.e., passive probing) from counter values related to the user data traffic on communication links. For example, links $\mathbf{107}_{1\text{-}N}$, links between 105 and $\mathbf{106}_{1\text{-}M}$, links between $\mathbf{103}_1$ and $\mathbf{106}_{1\text{-}M}$, and/or DSL links between $\mathbf{103}_2$ and 104.

In one embodiment, the counter values include at least one of packet error counts, packet retransmission counts, successful ACK message counts, etc. In one embodiment, the one or more communication devices $\mathbf{103}_{1\text{-}N}$ are operable to read operational data (i.e., execute passive probing) during or after executing active probing.

The accuracy of the measured performance of a communication link may be dependent on the characteristics of the user's traffic patterns and the characteristics of the noise and channel environments. In an environment, noise and channel might vary frequently. In another environment, noise and channel might vary infrequently. In yet another environment, noise and channel might vary frequently but mostly between two states only. In one embodiment, the one or more communication devices $\mathbf{103}_{1\text{-}N}$ are operable to measure performance and then train or configure their respective operating algorithms as a function of one or more criteria including at least one of: time of day, time of the week, type of communication device, manufacturer and model of equipment, equipment characteristics, firmware, backbone limitations, user's network usage pattern, radio-frequency (RF) characteristics including at least one of: signal power, frequency bands and mode of operation, environment statistics, or data on operation of communication devices adjacent to the communication device, wherein the data includes at least one of interference channels and levels. The noise may include interference from other communication devices operating in the same frequency band.

In one embodiment, the one or more communication devices $\mathbf{103}_{1\text{-}N}$ are operable to compute throughput of the communication devices $\mathbf{103}_{1\text{-}N}$ using active probing data for measuring performance of the communication link.

In the embodiments discussed herein, active data (i.e., test data) may comprise Ethernet packets that are sent by a communication device (e.g., device $\mathbf{103}_1$) to another communication device (e.g., STA $\mathbf{106}_1$) over a communication link (dotted line), where the other communication device (e.g., STA $\mathbf{106}_1$) does not have the application test software to measure assist with performance measurement of the communication link using the received active data. In such an embodiment, the Ethernet packets eventually get dropped by higher layers (e.g., layers 3, 4 etc). In this embodiment, the lower IEEE 802.11 PHY/MAC layer of other communication device (e.g., STA $\mathbf{106}_1$) will send an 'ACK' signal for each successfully received Wi-Fi packet from the communication device (e.g., device $\mathbf{103}_1$) because of the inherent design of Wi-Fi PHY/MAC layer.

In one embodiment, such ACK signals are counted in the Wi-Fi driver of the communication device (e.g., device $103_1$), and the count is available as operational data at the communication device (e.g., device $103_1$). The count is part of many operational data that are available at the communication device (e.g., device $103_1$). This count is used to accurately calculate the total number of user data bytes that were successfully received by the other communication device (e.g., STA $106_1$) by counting the number of layer-2 ACK messages or via similar counters for a fixed duration of time. Because the communication device (e.g., device $103_1$) generated enough Ethernet packets to make sure that PHY layer is running at the highest speed possible, the calculated bytes divided over the time duration represents the accurate throughput of the Wi-Fi link (dotted line between $103_1$ and $106_1$).

In this embodiment, there is no need for any application-layer testing software to be available at the other communication device (e.g., STA $106_1$), and therefore the other communication device (e.g., STA $106_1$) can be used in any situation with access to one of the two network communication devices.

The embodiment discussed herein can also be applied from the other communication device (e.g., STA $106_1$) side to send Ethernet packets to the communication device $103_1$ and measure the throughput from STA $106_1$ to the communication device $103_1$. In such an embodiment, there is no need for any application-layer testing software to be available at the communication device $103_1$ to measure performance of the communication link between STA $106_1$ and communication device $103_1$.

The embodiments of this disclosure are not limited to Ethernet packets or Wi-Fi. The embodiments of this disclosure can be used whenever relevant operational data is made available at transmitter side. Such operational data include Ethernet packet count in Wi-Fi ATM cell count in ATM over DSL, etc.

Figure 2:
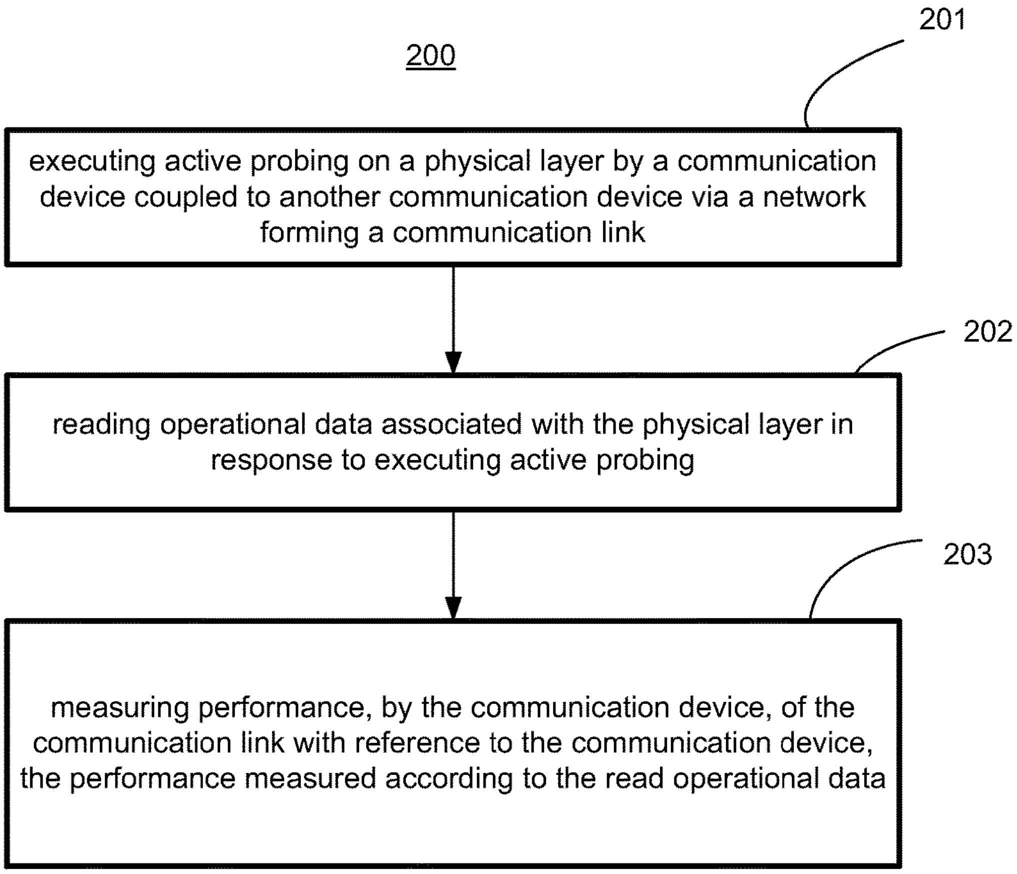
FIG. 2 is a flowchart for measuring performance of a communication link, according to one embodiment of the disclosure.

FIG. 2 is a flowchart 200 for measuring performance of a communication link, according to one embodiment of the disclosure. Although the blocks in the flowcharts with reference to FIG. 2 are shown in a particular order, the order of the actions can be modified. Thus, the illustrated embodiments can be performed in a different order, and some actions/blocks may be performed in parallel. The flowchart of FIG. 2 is illustrated with reference to the embodiments of FIG. 1.

In one embodiment, at block 201 active probing is executed by the communication device (e.g., $103_1$) that has the application software installed on it which is used for measuring performance of a communication link associated with the communication device $103_1$ and another communication device (e.g., STA $106_1$). In one embodiment, the active probing is executed on the PHY layer. As discussed herein, active probing is executed by sending test pattern/data (e.g., Ethernet packets) over the network from one communication device to another communication device, and then measuring the response from the sent test pattern.

At block 202, operational data is read by the communication device $103_1$ associated with the PHY layer in response to executing active probing. In one embodiment, the communication device $103_1$ is operable to read operational data which includes data related to channel (e.g., dotted link between $103_1$ and $106_1$) and its noise condition, data relevant to the current setting of the communication devices $103_1$, and counter values related to user data traffic between the communication devices $103_1$ and the other communication device $106_1$, wherein the operational data is relevant to the current settings of the communication device $103_1$. Examples of such operational data are successful transmit packet counts, successful receive packet counts, ACK packet counts, errored packet counts, discarded packet counts, retransmission counts, etc.

At block 203, the communication device $103_1$ measures performance of the communication link according to the read operational data. In such an embodiment, the other communication device $106_1$ does not have the application software to assist with measuring performance of the communication link.

Figure 3:
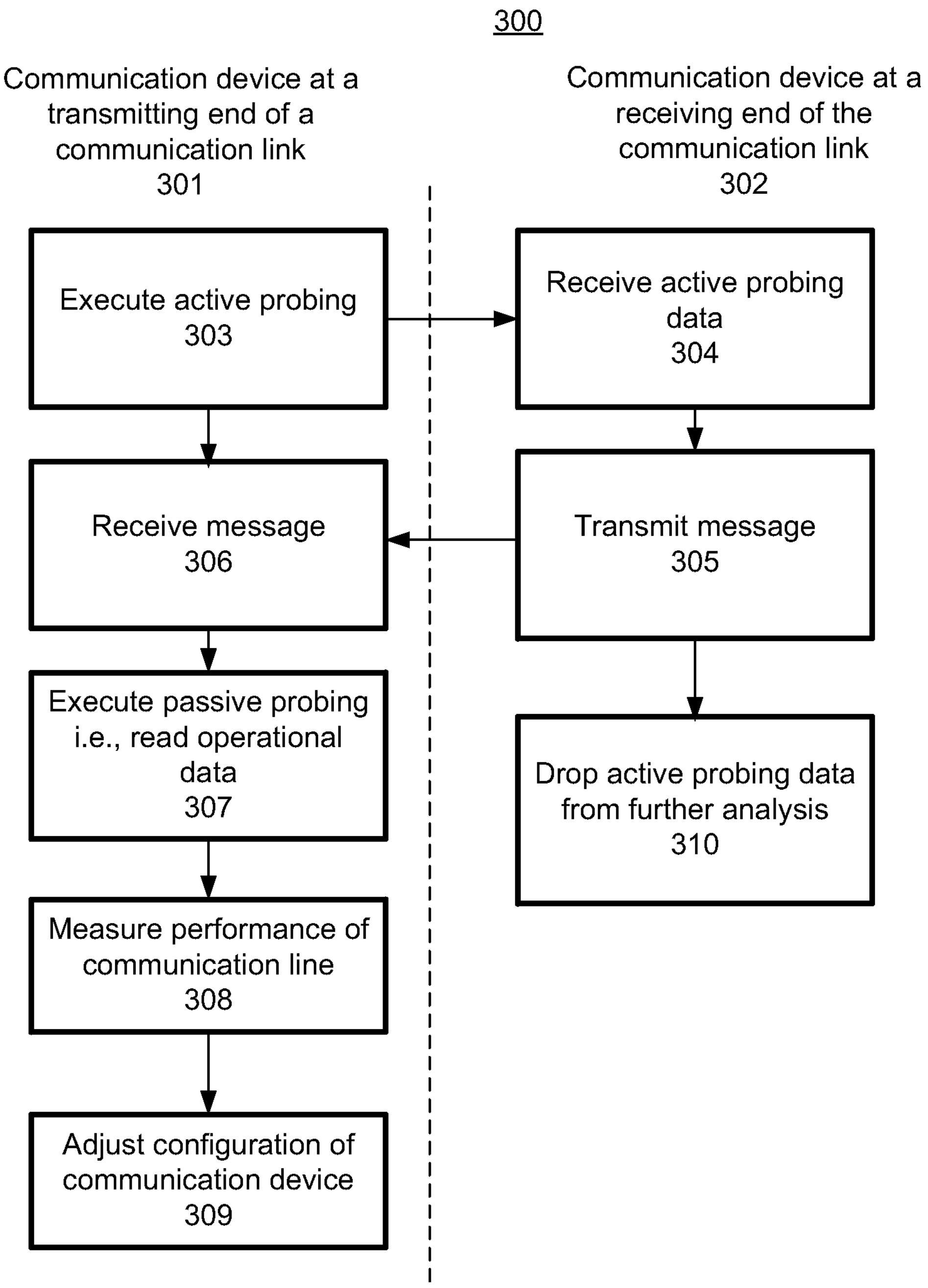
FIG. 3 is a detailed flowchart for measuring performance of a communication link, according to one embodiment of the disclosure.

FIG. 3 is a detailed flowchart 300 for measuring performance of a communication link, according to one embodiment of the disclosure. Although the blocks in the flowchart with reference to FIG. 3 are shown in a particular order, the order of the actions can be modified. Thus, the illustrated embodiments can be performed in a different order, and some actions/blocks may be performed in parallel. The flowchart of FIG. 3 is illustrated with reference to the embodiments of FIGS. 1-2.

The flowchart 300 illustrates the method performed for measuring performance by the communication device 301 (e.g., $103_1$) which has the application test software installed on it. The method 300 also illustrates the method performed by the receiving communication device 302 (e.g., $106_1$) which does not have the traditional application test software installed for measuring performance of the communication link between the communication device 301 (e.g., $103_1$) and the other communication device 302 (e.g., $106_1$).

At block 303, the communication device 301 (e.g., $103_1$) executes active probing. In this embodiment, test data is transmitted by the communication device 301 (e.g., $103_1$) to the other communication device 302 (e.g., $106_1$). At block 304, the other communication device 302 (e.g., $106_1$) receives the test data. Since, this communication device 302 does not have the test application software on it, the test data is eventually dropped in higher layers (e.g., layer 3 or 4). However, upon receiving the test data, the communication device 302 sends an ACK signal or a similar message at block 305 to the communication device 301, due to the inherent design of the underlying PHY/MAC communication protocol. This ACK signal is transmitted regardless of the test data being dropped in higher layers. At block 310, the communication device 302 eventually drops the received test data because the communication device 302 determines that it does not have the means (i.e., application software) to process the test data received from the communication device 301.

At block 306, the communication device 301 receives the ACK message from communication device 302. At block 307, the communication device 301 executes passive probing i.e., reads various operational data associated with the communication device 301. In one embodiment, such ACK signals are counted in the communication device 301 and the count is available as operational data at the communication device 301. The count is part of many operational data that are available at the communication device 301. In one embodiment, this count is used to accurately calculate the total number of user data bytes that were successfully received by the other communication device 301 by counting the number of layer-2 ACK messages. Because the communication device 301 generates enough test data (i.e., Ethernet packets) to make sure that PHY layer is running at the highest speed possible, at block 308 the calculated bytes from the count are divided over time duration to determine the accurate throughput (i.e., a performance metric) of the communication link.

At block 309, the communication device 301 adjusts its configuration parameters e.g., power, transmission speed, etc. according to the measured performance of the communication link. For example, if the throughput of the communication link is above the needed value, then there is no need to over perform the communication system because there is not much gain to be had. In such a case, the communication device 301 can reduce its transmit power for the purpose of saving energy.

In one embodiment, measuring performance is performed for different Quality-of-Service (QoS) settings in test data. For example, the test data itself is generated with different QoS marking in the header such that performance per QoS marking can be observed. In one embodiment, this marking is controlled in the active probing data.

Figure 4:
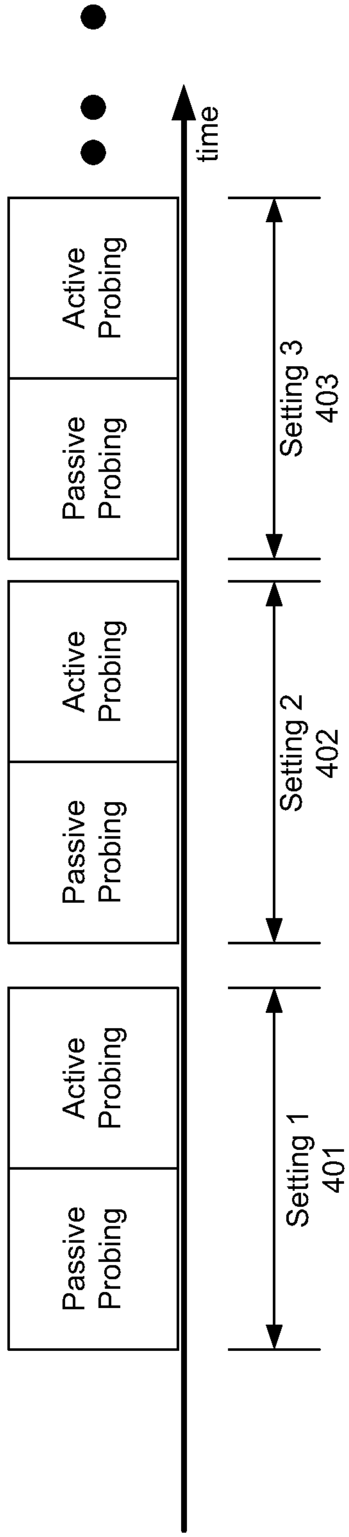
FIG. 4 illustrates a sequence of multiple configuration settings for a communication device, the settings used for determining operation settings of the communication device after measuring performance of the communication link, according to one embodiment of the disclosure.

FIG. 4 illustrates a sequence 400 of measuring performance for multiple configuration settings of a communication device (e.g., $\mathbf{10}_{31}$), the measurements used for determining the desired operation settings of the communication device of the communication link, according to one embodiment of the disclosure.

In this embodiment in FIG. 4, both passive probing and active probing are used to determine optimal performance settings for the communication device $\mathbf{103}_1$. In one embodiment, the throughput of the communication device $\mathbf{103}_1$ is tested with 'N' number of configurations, where 'N' is an integer. In the example of FIG. 4, N=3. In other examples, 'N' can be any number.

In one embodiment, a single passive probing is followed by a single active probing for each measurement of a performance setting. In another embodiment, another passive probing is added after active probing. In general, any combinations of passive and active probing can be used for each configuration setting such that more accurate decision can be made based on which configuration setting is a better one to use for the communication link that is being evaluated.

Examples of possible configuration parameters for Wi-Fi AP are channel, radio band, channel bonding, guard interval length, fragmentation threshold, retry limit, on/off of request to send (RTS) and clear to send (CTS), beacon interval, transmit power, multiple antenna mode, preamble setting, modulation and coding scheme, Quality of Service (QoS) setting, etc.

In one embodiment, by collecting passive and active probing performance results with different configurations, it is possible to accurately measure the performance for different configurations and subsequently choose a desirable configuration to operate the communication device $\mathbf{103}_1$.

For instance, the measured throughputs are 5 Mbps, 15 Mbps and 20 Mbps for setting 1 (default) 401, setting 2 402, and setting 3 403, respectively. If the goal is to maximize the throughput, the communication device $\mathbf{103}_1$ can be configured with setting 3 403 such that 20 Mbps can be provided to the user. In another example, the measured latencies are 75 ms (millisecond), 35 ms, and 5 ms for setting 1 (default) 401, setting 2 402, and setting 3 403, respectively. If the goal is to reduce (e.g., minimize) the latency, the communication device $\mathbf{103}_1$ can be configured with setting 3 403 such that 5 ms latency can be provided to the user.

In one embodiment, probing (active and/or passive) may be used in an adaptive and/or real-time way. For instance, active probing may be used only when there is low volume of user traffic such that the impact to user experience is minimized. In another example, probing may be used when the user or network manager would like to diagnose the situation (real-time use of the solution), too.

Figure 5:
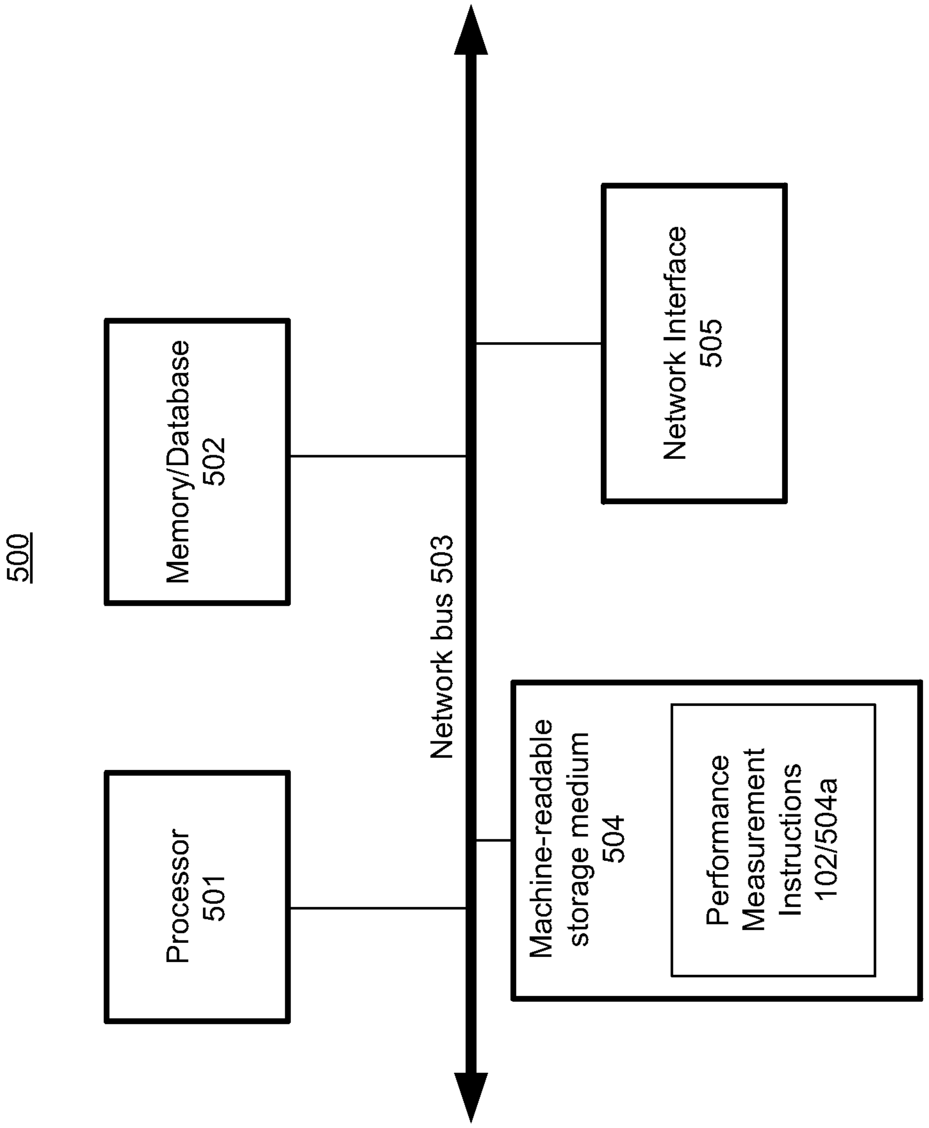
FIG. 5 is a processor-based system having machine-readable storage medium with computer executable instructions operable to measure performance of a communication link, according to one embodiment of the disclosure.

FIG. 5 is a processor-based system 500 having machine-readable storage medium 504 with computer executable instructions 102/504*a* which are operable to measure performance of a communication link, according to one embodiment of the disclosure. The storage medium 504 and associated computer executable instructions 102/504*a* may be in any of the communication devices and/or servers discussed herein. The computer-machine-readable/executable instructions 102/504*a* are executed by a processor 501. Elements of embodiments are provided as machine-readable medium for storing the computer-executable instructions (e.g., instructions to implement the flowcharts of FIGS. 2-4 and other processes discussed in the description).

In one embodiment, the processor-based system 500 further comprises a database 502 to store data used by the instructions 102/504*a*. In one embodiment, the processor-based system 500 includes a network interface 505 to communicate with other devices. In one embodiment, the components of the processor-based system 500 communicate with one another via a network bus 503.

The machine-readable storage medium 504 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, in one embodiment a method for performance measurement comprises: executing active probing on a physical layer by a communication device coupled to another communication device via a network forming a communication link; reading operational data associated with the communication link in response to executing active probing; and measuring performance, by the communication device, of the communication link with reference to the communication device, the performance measured according to the read operational data.

In one embodiment, the operational data indicates a number of successful transmissions of packets during active probing. In one embodiment, the operational data indicates size of successful transmission of data through the communication link. In one embodiment, the operational data is from layer 1 or layer 2 associated with the communication link.

In one embodiment, executing active probing comprises transmitting test data configured to flood layer 1 or layer 2 of the network. In one embodiment, measuring performance of the communication link comprises applying operational data associated with the test data and user traffic. In one embodiment, the other communication device lacks ability to execute active probing on Application Layer with the communication device. In one embodiment, executing active probing comprises sending packets to the other communication device, the packets to use full capacity of layer 1 or layer 2 of the network. In one embodiment, the packets are not application specific packets. In one embodiment, measuring performance is performed for different Quality-of-Service (QoS) settings in test data.

In one embodiment, measuring performance is performed for different configuration settings of the communication device. In one embodiment, the configuration settings include at least one of: frequency band; bandwidth in use; QoS parameter; rate-adaptation method; coding method; beam-forming method; transmit power adaptation method; Request to Send (RTS) and Clear to Send (CTS); frame-bursting; channel; channel bonding; guard interval length; fragmentation threshold; retry limit; on/off of RTS and CTS; beacon interval; transmit power; multiple antenna mode; preamble setting; modulation and coding scheme; or Quality of Service (QoS) setting.

In one embodiment, executing active probing is performed before or after executing passive probing with a first configuration setting. In one embodiment, the method further comprises: executing passive probing with a second configuration setting; and executing active probing with the second configuration setting, the second configuration setting being different from the first configuration setting. In one embodiment, measuring performance comprises measuring throughput of the communication device with first and second configuration settings.

In one embodiment, executing passive probing comprises: reading operational data which includes data related to channel and its noise condition and counter values related to user data traffic between the communication device and another communication device, wherein the operational data is relevant to the current settings of the communication device. In one embodiment, executing active probing comprises: transmitting active probing data from the communication device to the other communication device over layer 1 or layer 2 of the network; and waiting for a predetermined time before reading operational data.

In one embodiment, executing active probing comprises: transmitting active probing data from the communication device to the other communication device over layer 1 or layer 2 of the network; and receiving a report indicating amount of data or data received by the other communication device.

In one embodiment, the communication device comprises at least one of: an access point (AP); a base station; a wireless local area network (LAN) device; a digital subscriber line access multiplexer (DSLAM); a gateway; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In another example, a machine-readable storage medium is provided having machine executable instructions that when accessed by a computer, cause the computer to perform a method for performance measurement as discussed herein.

In another example, a system for performance measurement comprises: a network; and a first communication device communicatively coupled to a second communication device via the network, the first communication device operable to: execute active probing on a physical layer by the first communication; and measure throughput, by the first communication device, of the network.

In one embodiment, the first communication device is operable to read operational data associated with the communication link in response to executing active probing. In one embodiment, the first communication device operable to measure throughput according to the read operational data. In one embodiment, the operational data indicates a number of successful transmissions of packets during active probing. In one embodiment, the operational data indicates size of successful transmission of data through the communication link. In one embodiment, the operational data is from layer 1 or layer 2 associated with the communication link. In one embodiment, the first communication device is operable to execute active probing by transmitting test data configured to flood layer 1 or layer 2 of the network.

In one embodiment, first communication device to measure performance of the communication link by applying operational data associated with the test data and user traffic. In one embodiment, the second communication device lacks ability to execute active probing on Application Layer with the communication device. In one embodiment, the first communication device to execute active probing by sending packets to the second communication device, the packets to use full capacity of layer 1 or layer 2 of the network. In one embodiment, the packets are not application specific packets. In one embodiment, the first communication device to measure performance is performed for different Quality-of-Service (QoS) settings in test data.

In one embodiment, the first communication device to measure performance for different configuration settings of the first communication device, wherein the configuration settings include at least one of: frequency band; bandwidth in use; QoS parameter; rate-adaptation method; coding method; beam-forming method; transmit power adaptation method; Request to Send (RTS) and Clear to Send (CTS); frame-bursting; channel; channel bonding; guard interval length; fragmentation threshold; retry limit; on/off of RTS and CTS; beacon interval; transmit power; multiple antenna mode; preamble setting; modulation and coding scheme; or Quality of Service (QoS) setting.

In one embodiment, the first communication device is operable to execute passive probing with a first configuration setting before or after executing active probing. In one embodiment, the first communication device is operable to: execute passive probing with a second configuration setting; and execute active probing with the second configuration setting, the second configuration setting being different from the first configuration setting. In one embodiment, the first communication device is operable to measure performance by measuring throughput of the first communication device with first and second configuration settings. In one embodiment, the first communication device is operable to execute passive probing by reading operational data which includes data related to channel and its noise condition and counter values related to user data traffic between the first communication device and second communication device, wherein the operational data is relevant to the current settings of the communication device.

In one embodiment, the first communication device is operable execute active probing by transmitting active probing data from the first communication device to the second communication device over layer 1 or layer 2 of the network; and by waiting for a predetermined time before reading operational data. In one embodiment, the first communication device is operable to execute active probing by: transmitting active probing data from the first communication device to the second communication device over layer 1 or layer 2 of the network; and receiving a report indicating amount of data or data received by the second communication device.

In one embodiment, the first communication device comprises at least one of: an access point (AP); a base station; a wireless local area network (LAN) device; a digital subscriber line access multiplexer (DSLAM); a gateway; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A method for performance measurement, the method comprising:

executing active probing on a physical layer by transmitting active probing data from a communication device coupled to another communication device via a network forming a communication link, the active probing data are not received at communication layer 3 or above at the another communication device;

reading operational data associated with the communication link in response to executing active probing, the operational data comprising data generated by active probing on the communication link; and measuring performance, by the communication device, of the communication link with reference to the communication device, the performance measured according to the read operational data, wherein the operational data relates to information regarding a configuration of layer 1 or layer 2 of the communication link.

2. The method of claim 1, wherein the operational data indicates a number of successful transmissions of packets during active probing.

3. The method of claim 1, wherein the operational data indicates size of successful transmission of data through the communication link.

4. The method of claim 1, wherein the operational data is from layer 1 or layer 2 associated with the communication link.

5. The method of claim 1, wherein executing active probing comprises transmitting test data configured to flood layer 1 or layer 2 of the network.

6. The method of claim 1, wherein the other communication device lacks ability to execute active probing on an Application Layer with the communication device.

7. The method of claim 1, wherein executing active probing comprises sending packets to the other communication device, the packets to use full capacity of layer 1 or layer 2 of the network.

8. The method of claim 7, wherein the packets are not application specific packets.

9. The method of claim 1, wherein measuring performance is performed for different Quality-of-Service (QoS) settings in test data.

10. The method of claim 1, wherein measuring performance is performed for different configuration settings of the communication device.

11. The method of claim 10, wherein the configuration settings include at least one of:

frequency band; bandwidth in use;

QoS parameter;

rate-adaptation method; coding method;

beam-forming method;

transmit power adaptation method;

Request to Send (RTS) and Clear to Send (CTS); frame-bursting;

channel;

channel bonding; guard interval length;

fragmentation threshold; retry limit;

on/off of RTS and CTS;

beacon interval; transmit power; multiple antenna mode; preamble setting;

modulation and coding scheme; or

Quality of Service (QoS) setting.

12. The method of claim 1, wherein executing active probing is performed before or after executing passive probing with a first configuration setting.

13. The method of claim 12 further comprises:
executing passive probing with a second configuration setting; and
executing active probing with the second configuration setting, the second configuration setting being different from the first configuration setting.

14. The method of claim 13, wherein measuring performance comprises measuring throughput of the communication device with first and second configuration settings.

15. The method of claim 1, wherein executing passive probing comprises:
reading operational data which includes data related to a channel and its noise condition and counter values related to user data traffic between the communication device and another communication device, wherein the operational data is relevant to the current settings of the communication device.

16. The method of claim 1, wherein executing active probing comprises:
transmitting active probing data from the communication device to the other communication device over layer 1 or layer 2 of the network; and
waiting for a predetermined time before reading operational data.

17. The method of claim 1, wherein executing active probing comprises:
transmitting active probing data from the communication device to the other communication device over layer 1 or layer 2 of the network; and
receiving a report indicating amount of data or data received by the other communication device.

18. The method of claim 1, wherein the communication device comprises at least one of:
an access point (AP); a base station;
a wireless local area network (LAN) device;
a digital subscriber line access multiplexer (DSLAM); a gateway;
a performance enhancement device;
a Digital Subscriber Line (DSL) Customer Premises Equipment (CPE) modem;
an in-home powerline device;
a Home Phoneline Network Alliance (HPNA) based device;
an in-home coax distribution device;
a G.hn (Global Home Networking Standard) compatible device;
an in-home metering communication device;
an in-home appliance communicatively interfaced with the LAN;
a wireless femtocell base station;
a wireless WiFi compatible base station; a wireless mobile device repeater;
a wireless mobile device base station; nodes within an ad-hoc/mesh network;
a set-top box (STB)/set-top unit (STU) customer electronics device;
an Internet Protocol (IP) enabled television;
an IP enabled media player;
an IP enabled gaming console; an Ethernet gateway;
a computing device connected to the LAN;
an Ethernet connected computer peripheral device;
an Ethernet connected router;
an Ethernet connected wireless bridge;
an Ethernet connected network bridge; or
an Ethernet connected network switch.

19. A system for performance measurement, the system comprising:
a network; and
a first communication device communicatively coupled to a second communication device via the network, the first communication device operable to:
execute active probing on a physical layer to transmit active probing data by the first communication device, wherein the active probing data are not received at communication layer 3 or above at the second communication device, the first communication device is operable to read operational data associated with the communication link in response to executing active probing, the operational data comprising data generated by active probing on the communication link, wherein the operational data relates to information regarding a configuration of a layer 1 or layer 2 of the communication link; and
measure throughput, by the first communication device, of the network.

20. The system of claim 19, wherein the first communication device is operable to measure throughput according to the read operational data.

21. The system of claim 19, wherein the operational data indicates a number of successful transmissions of packets during active probing.

22. The system of claim 19, wherein the operational data indicates size of successful transmission of data through the communication link.

23. The system of claim 19, wherein the operational data is from layer 1 or layer 2 associated with the communication link.

24. The system of claim 19, wherein the first communication device is operable to execute active probing by transmitting test data configured to flood layer 1 or layer 2 of the network.

25. The system of claim 19, wherein the second communication device lacks ability to execute active probing on an Application Layer with the communication device.

26. The system of claim 19, wherein the first communication device is to execute active probing by sending packets to the second communication device, the packets to use full capacity of layer 1 or layer 2 of the network.

27. The system of claim 26, wherein the packets are not application specific packets.

28. The system of claim 19, wherein the first communication device is to measure performance for different Quality-of-Service (QoS) settings in test data generated by active probing.

29. The system of claim 19, wherein the first communication device is to measure performance for different configuration settings of the first communication device.

30. The system of claim 29, wherein the configuration settings include at least one of:
frequency band;
bandwidth in use;
QoS parameter;
rate-adaptation method;
coding method;
beam-forming method;
transmit power adaptation method;
Request to Send (RTS) and Clear to Send (CTS);
frame-bursting;
channel;
channel bonding;
guard interval length;

fragmentation threshold;

retry limit;

on/off of RTS and CTS;

beacon interval;

transmit power; multiple antenna mode;

preamble setting;

modulation and coding scheme; or

Quality of Service (QoS) setting.

31. The system of claim 19, wherein the first communication device is operable to execute passive probing with a first configuration setting before or after executing active probing.

32. The system of claim 23, wherein the first communication device is operable to:

execute passive probing with a second configuration setting; and execute active probing with the second configuration setting, the second configuration setting being different from the first configuration setting.

33. The system of claim 32, wherein the first communication device is operable to measure performance by measuring throughput of the first communication device with first and second configuration settings.

34. The system of claim 19, wherein the first communication device is operable to execute passive probing by reading operational data which includes data related to a channel and its noise condition and counter values related to user data traffic between the first communication device and second communication device, wherein the operational data is relevant to the current settings of the communication device.

35. The system of claim 19, wherein the first communication device is operable to execute active probing by transmitting active probing data from the first communication device to the second communication device over layer 1 or layer 2 of the network; and by waiting for a predetermined time before reading operational data.

36. The system of claim 19, wherein the first communication device is operable to execute active probing by:

transmitting active probing data from the first communication device to the second communication device over layer 1 or layer 2 of the network; and receiving a report indicating amount of data or data received by the second communication device.

37. The system of claim 19, wherein the first communication device comprises at least one of:

an access point (AP); a base station;

a wireless local area network (LAN) device;

a digital subscriber line access multiplexer (DSLAM); a gateway;

a performance enhancement device;

a Digital Subscriber Line (DSL) Customer Premises Equipment (CPE) modem;

an in-home powerline device;

a Home Phoneline Network Alliance (HPNA) based device;

an in-home coax distribution device;

a G.hn (Global Home Networking Standard) compatible device;

an in-home metering communication device;

an in-home appliance communicatively interfaced with the LAN;

a wireless femtocell base station;

a wireless WiFi compatible base station;

a wireless mobile device repeater;

a wireless mobile device base station;

nodes within an ad-hoc/mesh network;

a set-top box (STB)/set-top unit (STU) customer electronics device;

an Internet Protocol (IP) enabled television;

an IP enabled media player;

an IP enabled gaming console; an Ethernet gateway;

a computing device connected to the LAN;

an Ethernet connected computer peripheral device;

an Ethernet connected router;

an Ethernet connected wireless bridge;

an Ethernet connected network bridge; or an Ethernet connected network switch.

* * * * *